Sept. 16, 1969  R. L. ALDER  3,466,755
MAINSPRING FORCE TRANSFER MEANS FOR SIGNALLING DRIFT INDICATOR
Filed March 22, 1967  3 Sheets-Sheet 1

INVENTOR.
ROBERT L. ALDER
BY C. J. Stelling
ATTORNEY

Sept. 16, 1969   R. L. ALDER   3,466,755
MAINSPRING FORCE TRANSFER MEANS FOR SIGNALLING DRIFT INDICATOR
Filed March 22, 1967   3 Sheets-Sheet 2
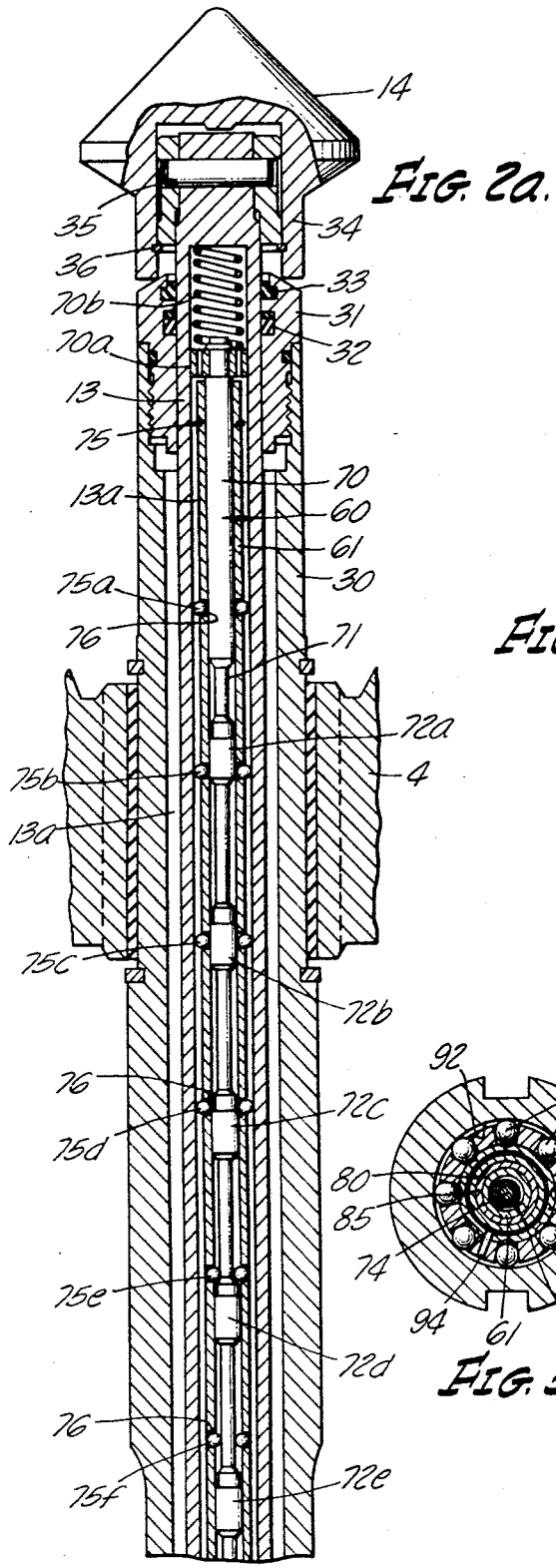
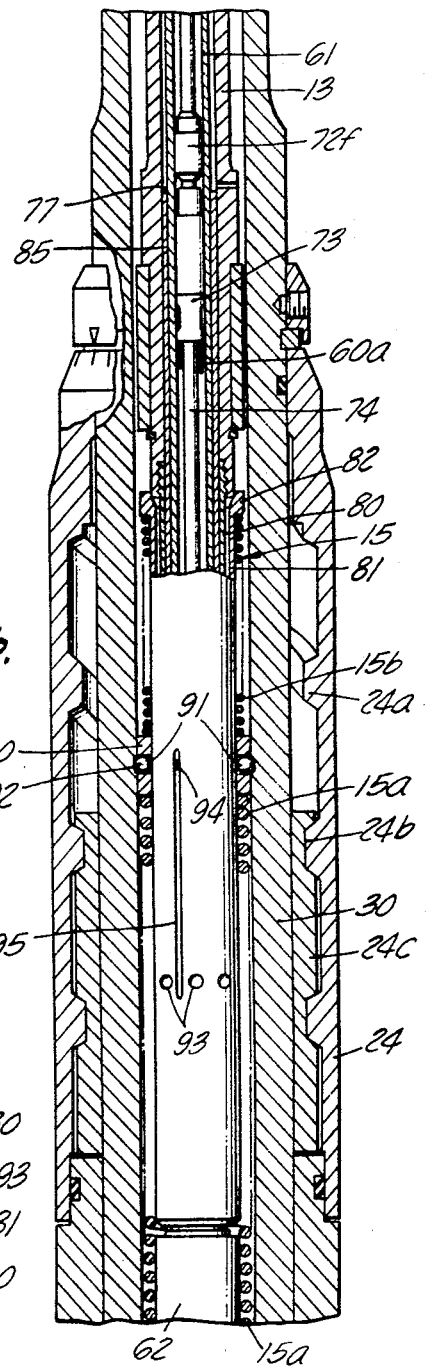
INVENTOR.
ROBERT L. ALDER
BY
ATTORNEY Sept. 16, 1969    R. L. ALDER    3,466,755
MAINSPRING FORCE TRANSFER MEANS FOR SIGNALLING DRIFT INDICATOR
Filed March 22, 1967    3 Sheets-Sheet 3

INVENTOR.
ROBERT L. ALDER
BY
ATTORNEY

United States Patent Office 3,466,755
Patented Sept. 16, 1969

3,466,755
MAINSPRING FORCE TRANSFER MEANS FOR SIGNALLING DRIFT INDICATOR
Robert L. Alder, Pasadena, Calif., assignor to Byron Jackson, Inc., Long Beach, Calif., a corporation of Delaware
Filed Mar. 22, 1967, Ser. No. 625,100
Int. Cl. E21b 47/02
U.S. Cl. 33—205                  10 Claims

ABSTRACT OF THE DISCLOSURE

A signalling drift indicator in which the mainspring is compound and includes a heavy spring, the force of which is transferred to the housing during the initial portion of outward movement of the gravity controlled knob shaft and during the terminal portion of inward movement of said shaft, and a light spring applies force to the said shaft to cause the initial portion and resist the terminal portion of shaft movement, the heavy spring acting on the shaft during the remainder of the outward and inward shaft movement.

---

The present invention relates to signalling drift indicators of the type generally disclosed and claimed in Alder et al. Letters Patent of the United States No. 3,176,407, granted Apr. 6, 1965.

Signalling drift indicators of the type here involved have been successfully employed to indicate deviation of oil, gas or other wells from the desired angle as drilling progresses. However, such instruments are subjected to extremely adverse operating conditions while essentially requiring consistent accuracy in order to assure that the well drilling operations may progress efficiently and with knowledge respecting the operating conditions in the well bore.

In general, signalling drift indicators of the type here involved are adapted to be disposed in a drill collar sub above the drill bit of a well drilling string. The instrument includes an elongated housing containing clean oil, and internal pressure is balanced with external pressure by a floating divider at the lower end of the instrument. At the upper end of the housing is a pulse ring attachment through which drilling fluid flows during drilling. Reciprocable in the upper end of the housing is a shaft having a knob which passes upwardly through the pulse rings upon spring loaded extension of the shaft from the housing and which responsive to flow of drilling fluid will force the shaft downward within the housing against the opposing spring force. As the knob passes downward through the pulse rings it cooperates with them to provide restrictions to flow. Such movement is retarded so that the successive restrictions cause distinct pressure pulses which will travel through the column of fluid to the earth's surface, where the signals may be recorded. Pendulum means are provided in the housing for limiting shaft extension in accordance with the angle from vertical at which the housing is disposed when the circulation of drilling fluid is halted. Thus, the pressure pulses recorded at the surface are indicative of the angle of the well in the region of the drill string sub in which the instrument housing is installed.

In the above cited patent there is disclosed a coding system including a rod, stop members selectively expandable by the rod, and a stop carried by the shaft and engageable with the expanded stop members. The coding rod is controlled by the pendulum means so that the ultimate travel of the shaft and thus the knob through the pulse rings is directly related to the angle of the instrument. Such an instrument therefore produces a pulse for each increment of the total angle which the instrument may measure. The present invention is disclosed in an instrument of this type, but also has application to the prior drift indicators which do not include the coding system.

In the operation of the drift indicator the so-called mainspring which forces the knob shaft outwardly with respect to the housing when the flow of drilling fluid is interrupted is such that it is strongest during the terminal stage of the inward movement of the shaft when drilling fluid circulation is resumed, but at the terminal stage of shaft movement the fluid pressure acting on the knob to force the shaft inwardly is less than such pressure acting on the knob during the production of pressure pulses. Due to the enlarged flow area and reduced velocity of the drilling fluid below the bottom pulse ring, it has been found that on occasions the force acting to move the knob and shaft to the full down position is inadequate to overcome the counter force of the mainspring. Failure of the shaft to move to the full down position is detrimental to the instrument inasmuch as the shaft is exposed to the errosive effects of drilling fluid and the pendulum will be hanging free during rotation of the drill string when drilling resumes.

Accordingly, an object of the present invention is to provide an improved signalling drift indicator in which a mainspring assembly is employed which during the last stage of downward movement of the knob and shaft offers the least counterforce, thereby facilitating seating of the knob in its full down position.

In accomplishing the foregoing object there is provided a compound mainspring assembly in which the major force of a strong mainspring is transferred to the housing during the final stage of movement of the shaft inwardly with respect to the housing and a separate weaker spring is employed to resiliently restrain the knob shaft during the final stage of its movement, the weaker spring being anchored against the housing.

Yet another object is to provide a mainspring force transfer mechanism for signalling drift indicators for well drilling strings having a shaft shiftable outwardly of a housing by a mainspring when drilling fluid circulation is interrupted and moveable into the housing against the force of the mainspring, wherein a force transfer or coupling collar encircles the shaft within the housing, the shaft being shiftable relative to the collar through a first stage of its outward movement under the influence of a light spring while the collar is coupled to the housing, the collar being released from the housing after the first stage of movement so as to move further outward with the shaft under the influence of a stronger spring, and conversely, the shaft and collar moving into the housing as a unit against the stronger spring until the collar is again coupled to the housing, and thereafter, the shaft moving further inwardly against the force of only the light spring.

Other objects and advantages of the invention will be hereinafter described or will become apparent to those skilled in the art, and the novel features of the invention will be defined in the appended claims.

In the accompanying drawings:

FIG. 2a is an enlarged fragmentary detail view in longitudinal section showing the upper end of the instrument of FIG. 1, minus the pulse ring assembly, and showing the upper portion of the coding system;

FIG. 2b is a downward extension of FIG. 2a, showing the mainspring force transfer means with both springs fully compressed and the coupling collar coupled to the housing;

FIG. 4b is a downward extension of FIG. 4a;

FIG. 5 is a transverse sectional view as taken in the line 5—5 of FIG. 3.

Like reference characters in the several views of the drawings and in the following description designate corresponding parts.

Figure 1:
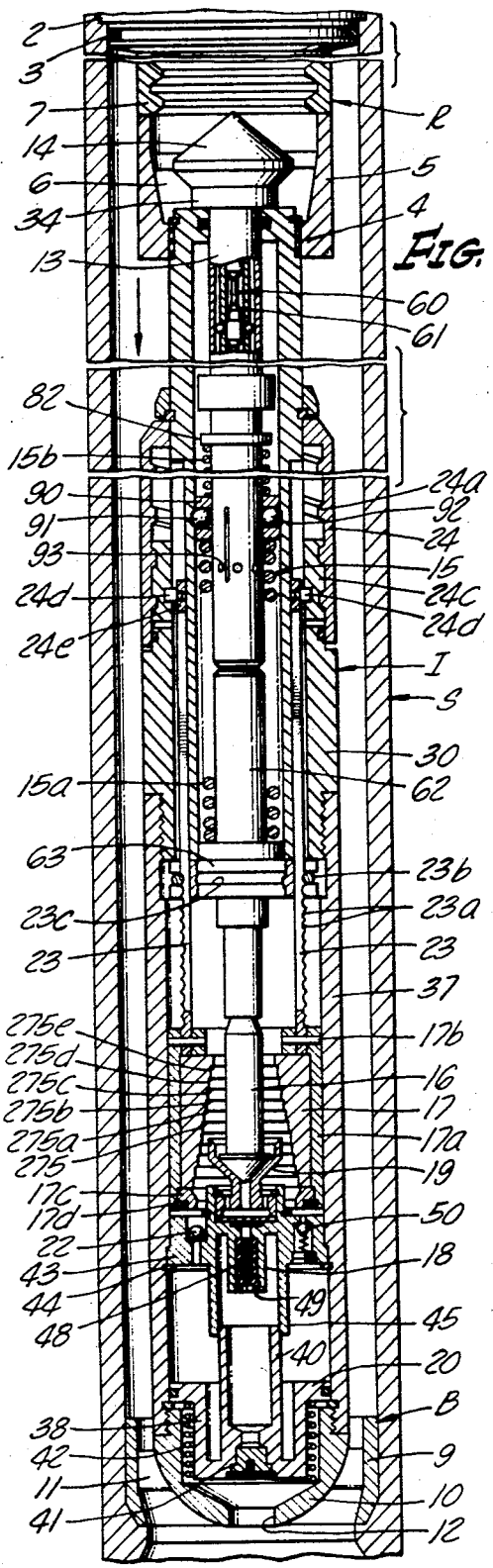
FIG. 1 is a fragmentary view partially in vertical section and with certain parts shown in elevation, illustrating a drift indicator instrument installed in a drill collar sub, the shaft being in its down position and the pendulum being on its seat.

Referring to FIG. 1, it will be seen that the drift indicator assembly of the invention is installed in a sub or length of drill collar S which is, as customary, adapted to be mounted in a string of drill pipe so as to conduct drilling fluid downwardly through the drill collar sub S to the bit, not shown, and the fluid then flowing upwardly outside of the drill string to the earth's surface. This assembly comprises an instrument housing generally denoted I having at its upper end a pulse ring sleeve R and at its lower end a bottom support B whereby the housing I is supported top and bottom in the sub S, and drilling fluid may flow through the sub S about the housing I.

In this connection, the pulse ring sleeve R has an enlarged end flange 2 which shoulders and is sealed in a seat 3. At its lower end the sleeve R is preferably provided with an integral cylindrical member 4 connected to the sleeve by arms 5 providing windows or flow passages 6, so that fluid may pass through the sleeve R. This mounting is preferably like that more specifically described in my copending application for United States Letters Patent, Ser. No. 561,637, filed June 29, 1966. Within the sleeve R it is provided with a series of axially spaced pulse rings 7, each of which is adapted to cause a pressure pulse in the fluid stream passing therethrough, as will hereinafter appear. This pulse ring construction may be like that more specifically described in my copending application for United States Letters Patent, Ser. No. 552,150, filed May 23, 1966.

Bottom support B has an outer rim 9 and a hub 10 on which the rim 9 is supported by webs 11 forming therebetween flow passages at the lower end of housing I. A port 12 is provided in the hub 10 so that fliud finds access to the housing I at its lower end.

The housing at its upper end has reciprocably mounted therein and extensible therefrom a shaft 13 having at its outer extremity a head or knob 14. Within housing I is spring means 15 which normally biases shaft 13 upwardly out of the housing I, thereby causing the head 14 to be moved upwardly through the pulse rings 7. However, the flow of drilling fluid downwardly through the pulse ring sleeve R will cause the head 14 to move downwardly into engagement with the upper end of housing I. Thus, during circulation of drilling fluid the shaft 13 and knob 14 will remain as shown in FIG. 1, but when such circulation is halted, the shaft will be forced outward and the head will move upward through the rings 7. Such circulation of drilling fluid is automatically ceased each time an additional length of drill pipe is to be added at the earth's surface, and otherwise as desired. When circulation is resumed, a pressure pulse is caused as the knob 14 passes through the rings 7 due to the restriction in flow area, and such pulses are detectable at the earth's surface by a typical pressure gauge or pressure recorder.

In order that the upward movement of the shaft 13 will be limited in accordance with the angle at which the housing I is disposed, gravity responsive means including a pendulum generally denoted at 16 is adapted to selectively engage pendulum stop means 17 as the pendulum moves upwardly. In order to retard downward movement of the shaft 13, so that as previously indicated the resultant pressure pulses will be distinct and adequately spaced, means generally indicated at 18 are provided for retarding fluid displacement through the pendulum seat 19. At the lower end of the housing I is a divider piston 20 shiftable to balance internal fluid pressure and external drilling fluid pressure and so as to enable the transfer of fluid through the retarding means 18 as the shaft 13 displaces fluid downwardly and the upward transfer of fluid through a check valve 22 as the shaft 13 is urged upwardly.

In order to change the relationship between the stop means 17 and the pendulum 16, means are provided for shifting the stop means axially in housing I. In this connection the stop means 17 is connected by rods 23 to adjuster means 24.

The instrument housing I includes an upper tubular section 30 having an upper shaft guide 31 threadedly mounted therein.

Shaft guide 31 has a seal and wiper means 32 and 33, respectively, engageable with the shaft. At the outer extremity of the shaft, the knob 14 is supported by means of a knob bushing 34, a pin 35 connecting the bushing to the shaft, and a snap ring 36 for retaining the knob on the bushing.

As seen in FIG. 1, the upper housing section 30 is threaded to a lower housing section 37 to the lower end of which is connected the hub 10 of bottom support B. Within the lower housing section is the divider piston 20 which has a skirt 38 adapted to extend into the hub 10. Mounted in the skirt 38 is a hollow piston guide stem 40, at the lower end of which is a filler plug 41, whereby the housing may be filled with clean oil or the like. A spring 42 seated in hub 10 is provided to normally bias the piston 20 upward, but essentially the piston 20 serves to apply pressure to the internal fluid equal to external fluid pressure and to move axially to allow extension of the shaft 13 from the housing.

Disposed above the piston 20 in lower housing section 37 is an orifice block 43, retained in place by a lock ring 44 and having a downwardly extended guide tube 45 slidably receiving the guide stem 40 of the piston. Supported by block 43 and within guide tube 45 is an orifice disc assembly having a stack of orifice discs 48 retained in place by a ported plug 49. At one side of block 43 is an upwardly opening ball check valve 22 and at another location in the block 43 is a downwardly opening spring loaded relief valve 50. Thus, the orifice block, the valve 22 and the orifice discs 48 constitute means for retarding downward flow of housing fluid through the block 43, while enabling comparatively free upward flow of housing fluid, as the shaft is extended from the housing and forced back into the housing during operation of the instrument. The valve 50 serves to relieve pressure in the event that such relief may be necessary. The block 43 also supports the aforementioned pendulum seat 19.

The pendulum 16 is adapted to seat in the pendulum seat 19 when the shaft 13 is in the downward position. The shaft is connected to the pendulum by coding means which allow upward movement of the shaft a distance inversely related to the upward travel of the pendulum.

Figure 3:
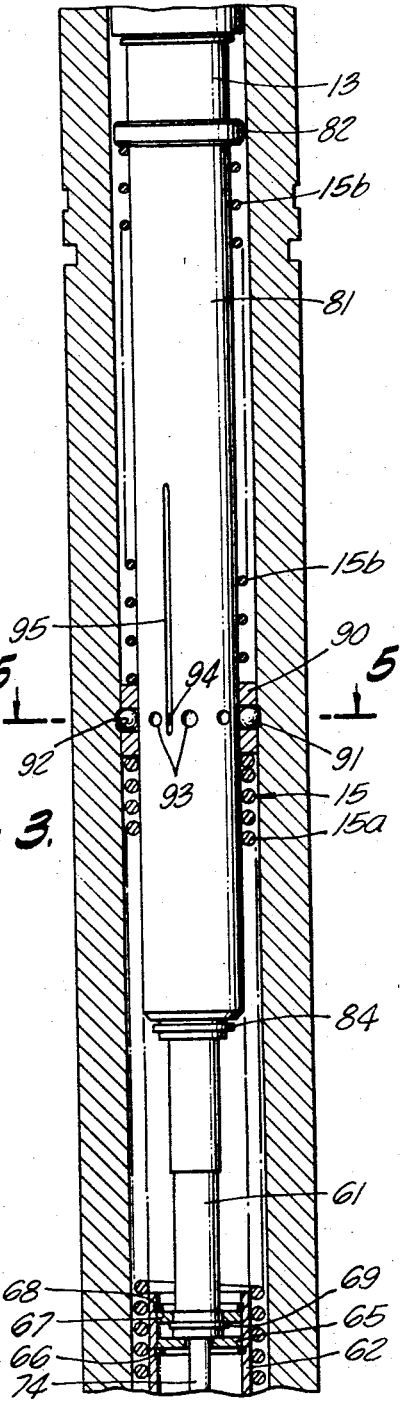
FIG. 3 is an enlarged fragmentary view partly in vertical section and partly in elevation, showing the force transfer means at the transfer point at which the light spring is expanded and the coupling collar is released from the housing.

The coding means includes, as seen in FIGS. 2a and 2b, a longitudinally extended coding rod 60 which is reciprocally disposed in a tubular guide and stop ball support 61. The guide 61 is connected to and essentially constitutes a portion of the upper housing section 30 and is supported at its lower end in a tubular part 62 which is formed as an upward extension of a block 63 which in turn is secured within the strument at the lower end of the upper housing section 30. More specifically, as seen in FIG. 3, the guide 61 seats at its lower end on a washer 65 which shoulders at 66 in the upper end of the tube 62, and in upwardly spaced relation to the washer 65 is a second washer 67 fastened in the tube 62 by lock ring 68, the lower end of the guide 61 extending through washer 67 and having a lock ring 69 which engages beneath the washer 67. Thus it is apparent that while the guide 61 is assembled with the tube 62 prior to connection of the block 63 to the lower end of housing section 30, means are provided so that the ultimate assembling of these components results in the guide 61 being rigidly and concentrically supported within the upper housing section 30.

The coding rod 60 previously referred to is composed of an upper end section 70 slidably disposed within the guide 61. Beneath the upper end 70 is an axially spaced series of reduced stem sections 71 and thimbles 72a, 72b, 72c, 72d, 72e and 72f. Beneath the lowermost thimble 72f is a connector 73 which connects the upper coding rod section 70 to a lower coding rod section 74, the latter extending downwardly through the guide 61 and the guide supporting washers 65 and 67 into the coding rod stop tube 62. At its upper end, coding rod section 70 has a centralizing guide 70a secured thereto and slidably engaged in the shaft 13, this guide being perforated to permit bypass of fluid within the instrument. Above the guide 70a is a coil spring 70b freely disposed in shaft 13 so as to engage and bias the coding rod downward when the shaft is in its downward position, as shown in FIG. 2a. As shown in FIG. 2b, there is another coil spring 60a which surrounds the lower coding rod section 74 within rod guide 61 and engages at its upper end with conector 73 and which at its lower end engages the support washer 65 for tube 61. This spring 60a is adapted to normally bias the coding rod 60 upward when the shaft 13 moves upwardly. It is the purpose of the thimbles 72a–72f depending upon the extent of upward movement of the coding rod, as will be more fully explained hereinafter, to selectively hold in an outwardly projected position a set of stop projections which more specifically are composed of sets of balls. In the illustrative embodiment, there are 6 sets of such balls respectively deignated from top to bottom, as viewed in FIG. 2a, 75a, 75b, 75c, 75d, 75e, 75f, adapted to be moved outward by thimbles 72a–72f, respectively. The balls are disposed in openings 76 in the rod guide 61 so that the latter also constitutes a ball support. The sets of balls are cammed outward upon engagement by the respective thimbles 72a–72f into annular space 13a defined by the guide 61 and the shaft 13. Within the shaft 13 (see FIG. 2b) is a stop 77 which defines the bottom of the just-mentioned annular space 13a and essentially this stop forms a portion of the shaft 13 which will limit upward movement of the latter, under the influence of spring 15, upon engagement of the stop 77 with one of the sets of stop balls 75a–75f, or upon engagement of the stop 77 with a stop ring 75 carried by tube 61 in spaced relation above stop balls 75a, thus selectively limiting upward movement of the knob 14 with respect to the pulse ring section R.

Figure 4A:
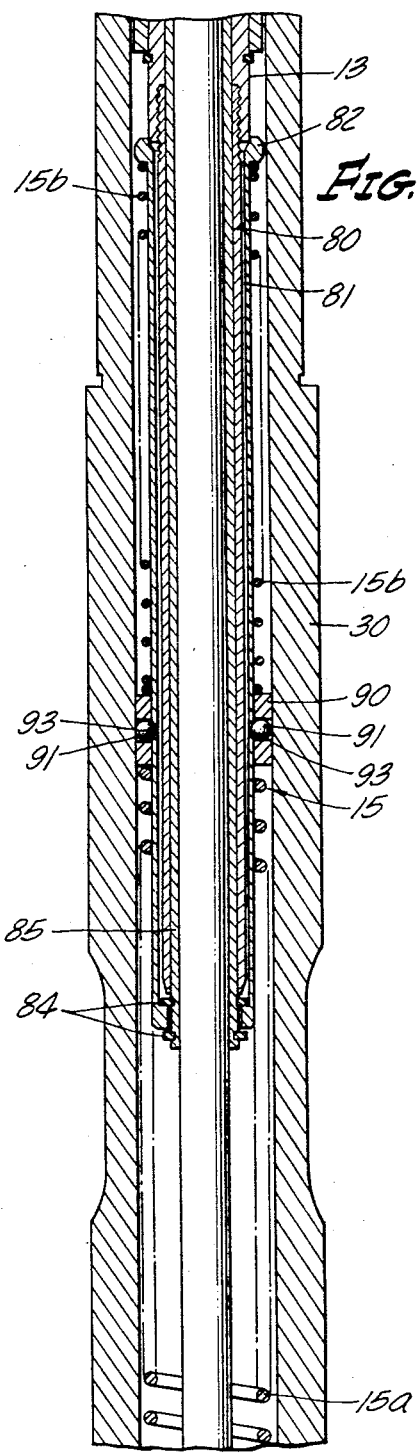
FIG. 4a is a fragmentary view generally corresponding to FIG. 3, but showing the shaft fully extended and the coupling collar in its uppermost position.

Essentially the stop shoulder 77 is a portion of the shaft 13, but in the specifically shown structure the shaft 13 incorporates means for allowing freedom of upward movement of the shaft independently of the stop shoulder 77 in order to relieve the stop shoulder and stop balls from excessive loading, in the event of back flow of drilling fluid through the drill collar 3, as well as during running of the drill string into the well bore following the changing of drill bits. Accordingly, as shown in FIGS. 2b and 4a, the shaft 13 is reduced in diameter at the point of its connection with a downwardly extended shaft extension 80. Concentrically disposed about the downward shaft extension 80 is a spring coupling sleeve 81 having an upper outwardly projecting flange 82 engaged by the upper end of the shaft biasing spring means 15. The lower end of the latter abutting, as shown in FIG. 2c, with the block 63. The just-mentioned flange 82 also abuts with the larger diameter upper shaft section so that the shaft 13 is biased upwardly. At its lower end the spring coupling sleeve 81, as seen in FIG. 4a, is connected between a pair of snap rings 84 with an internal sleeve 85 which is disposed within the downward shaft extension 80. Thus it will be seen that the shaft extension 80 is free to move upwardly relative to the spring coupling sleeve 81 and the connected internal sleeve 85, but the spring means 15 acts to bias the shaft 13 upwardly through the intermediary of the spring coupling sleeve 81 and internal sleeve 85, the latter having at its upward extremity the above mentioned stop shoulder 77 (see FIG. 2b). Therefore, the extent of upward movement of the shaft 13 and the knob 14 under the influence of the spring means 15 is limited by the stop 77 even though the shaft may be free to move further upwardly in response to the influences of fluid flow through the drill collar 3.

Thus it will be apparent that if the balls 75f be cammed into the path of stop 77, the shaft 13 will be limited in its upward travel under the influence of spring 15 to a position at which the knob 14 is disposed between the lowermost and the next above pulse ring 7. As the shaft 13 is allowed further increments of upward movement then the knob 14 will correspondingly be allowed further upward movement, a distance equal to another pulse ring per increment of shaft movement. Thus if the stop 77 is allowed to pass all the sets of stop balls 75f through 75a but engages stop ring 75, the knob 14 will be allowed to travel a distance equal to the spaces between seven pulse rings as a result of which downward movement of the knob caused by drilling fluid flow will cause the production of seven pressure pulses or signals which will travel through the column of drilling fluid to the earth's surface for detection or recordation as an indication of the angle at which the housing 30 is disposed within the well bore. As previously described, the gravity responsive pendulum and the cooperative pendulum stop means 17 serve to limit upward movement of the coding rod 60 so as to cause the projection of the apporpriate set of stop balls 75a through 75f to limit upward movement of shaft 13.

It will be noted that the spacing of axial stop balls 75a–75f relative to the thimbles 72a–72f, as shown in FIG. 2a, is such that none of the stop balls will be projected outwardly into the path of shaft stop 77 when the coding rod has traveled upwardly the minimum extent, but the latch balls 75f will be projected outwardly into the path of stop 77 when the coding rod has traveled upwardly to the maximum extent. As a result, the shaft will be allowed to move upwardly a minimum extent when balls 75f are projected outwardly and a maximum extent when none of the balls are projected outwardly. This inverse relationship as just described results in a direct relationship between the angle at which the housing is disposed relative to the gravity responsive pendulum when the upward motion of the pendulum is arrested and the extent of upward travel of shaft 13. More particularly, there is a resultant direct relationship between the number of pulse rings through which the knob 14 will pass upwardly and the number of pressure signals produced when the knob is forced downwardly by the flow of drilling fluid and the angle at which the housing I is disposed. Therefore, in respect of each increment of angular deviation there will be produced one pressure signal.

It will be noted, as seen in FIG. 1, that the stop means 17 comprises a supporting sleeve 17a connected to the abovedescribed adjuster rods 23 by means of pins 17b. Adjacent the bottom of sleeve 17a is a stop ring retainer 17c held in place by a snap ring 17d. Intermediate the retainer 17c and the upper end of the sleeve 17a is a series of angular stop shoulders of progressively diminishing diameter. In the illustrative embodiment there is an upper stop shoulder 275e and progressing downwardly are stop shoulders 275d, 275c, 275b, 275a and 275 of progressively increasing diameter. Thus, if upper movement of the pendulum 16 is arrested by stop shoulder 275e balls 75e will be caused to project into the path of stop shoulder 77 of the shaft 13. The same relationship exists between each of the stop shoulders 275 through 275d and balls 75a through 75d so that while the upward travel of the pendulum 16 will be inversely related to the angular deviation of the instrument housing I, the permitted upward travel of the coding rod 60 and hence the permitted upward travel of the shaft 13 will be directly related to the angular deviation of the housing I from a vertical disposition, and a single pressure signal will be induced in the drilling fluid stream for each increment of angular deviation.

The range of angular deviation at which the instrument may respond is adjustable in response to rotation of the housing part 24 relative to the upper housing 30, whereby to axially shift stop ring supporting sleeve 17a relative to the pendulum 16. As seen in FIGS. 2a and 2b, the housing part 24 is provided with an internal thread 24a. This internal thread 24a engages in a helical groove 24b in a connector sleeve 24c disposed within part 24 and slidably mounted on the upper housing section 30. Referring to FIG. 1, it will be noted that the sleeve 24c is connected by means of pins 24d to collar 24e from which depend the above noted rods 23 which extend downwardly through block 63 and are connected to the pins 17b of stop means 17.

The angular disposition of the part 24 relative to the upper housing section 30 thus determines the relative axial disposition of the stop shoulders in the lower housing section 37. In this manner in the extreme lowermost position of axial adjustment, as illustrated in FIG. 1, the sleeve 17 will be disposed for engagement of stop shoulders 275 through 275e by the pendulum 16, but in the event that the instrument is to be adjusted for detection of angular deviation ranging between say 3½ and 7 degrees, if shoulders 275 through 275e represent detection of angles ranging between 0 to 3½ degrees, the part 24 may be adjusted to move the stop shoulders upwardly so that a second set of stop shoulders of larger progressive diameters may be disposed for engagement by the pendulum 16. It will also be understood that the range of adjustment of the stop shoulders may be such that any combination of selected stop shoulders may be availed for the purpose of detecting angular deviation within any selected range of the maximum range for which the instrument is adapted by provision of stop shoulders of different diameters.

In order to fix the selected range, the rods 23 are provided with a series of axially spaced depressions 23a with which engage detent means 23b which, in the illustrative embodiment, comprises a spring ring disposed about the block 63 in a groove 23c. On the upper housing section 30 suitable means may be provided for indicating the adjusted position of the adjustor member 24.

The spring means 15 which biases the shaft 13 upwardly out of the instrument housing I abuts with the shaft at the flange 82 and with the housing at the block 63, as seen in FIG. 1. In the usual instrument of the type here involved, this spring means conventionally consists of a single spring which is compressed when the knob 14 is in the lowermost position and which expands as the knob and shaft move upwardly, following interruption of the circulation of drilling fluid. However, beneath the lowermost pulse ring 7 which cooperates with the knob 14 to produce the last pressure pulse, the flow passages 6 through the pulse ring support means afford substantial flow area, so that fluid velocity may not produce sufficient force to drive the knob downwardly to the fully seated position, thereby giving rise to problems in tool life and function.

Accordingly, the present invention provides a compound spring means 15 which exerts a minimum upward force on shaft 13 when the knob 14 is beneath the lowermost pulse ring 7. This compound spring means includes a comparatively heavy and strong lower main spring 15a and a comparatively light and weak main spring 15b, together with an intervening force transfer collar 90 providing means for transmitting the force of strong spring 15a to shaft 13, more particularly to shaft flange 82, through the light spring 15b to move the shaft outwardly with respect to the housing, while transferring the force of the strong spring to the housing at a predetermined point in inward movement of the shaft, and at the same time providing an abutment for the light spring 15b during the terminal portion of the inward movement of the shaft.

In FIGS. 1 and 2, the main springs 15a and 15b are both fully compressed and the knob 14 is in abutting engagement with the upper end of the housing section 30. In this view the force transfer collar 90 is at the point referred to above at which the force of large mainspring 15a is transferred to and absorbed in the housing section 30. It is notable in these views, that the force transfer collar 90 has carried thereby a plurality of latch elements or balls 91 disposed in radial openings in the collar and held outwardly in engagement in ball receiving means comprising annular groove 92 in body section 30 by spring coupling sleeve 81 and providing means whereby the collar 90 is connected to the body 30 and the expensive force of spring 15a is transferred to and absorbed by the housing 30 and offers no force tending to move the shaft upwardly. Likewise the smaller spring 15b seats on the collar 90 and provides the sole force tending to move the shaft 13 upwardly, a force which can be overcome by the action of fluid impinging on the head 14 and providing a force tending to move the shaft downwardly against spring 15b.

Referring to FIG. 2b, it will be noted that the shaft 13 including the coupling sleeve 81, is free to move upwardly under the influence of the spring 15b of spring means 15 when the downward flow of fluid past knob 14 is interrupted. Coupling sleeve 81 is provided at a location spaced downwardly from ball receiving groove 92, when the sleeve 81 is in the down position as shown, with ball receiving means comprising a number of circumferentially spaced depressions or sockets 93 which are in alignment with the balls 91 so that upon upward movement of shaft 13 and coupling sleeve 81 to the position shown in FIGS. 3 and 5, the balls will be disposed the depressions 93 and thereby allowed to move inwardly out of the groove 92.

Figure 4B:
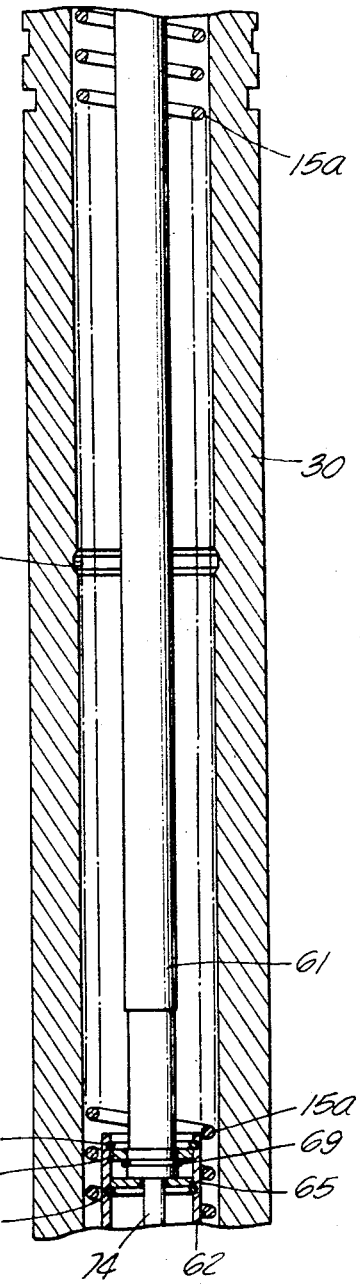

Such inward movement of the balls is caused by the force of lower spring 15a acting upwardly on coupling collar 90 and by a bevelled wall forming the upper side of the groove 92. Thereupon, the spring 15a will force collar 90 upwardly so that the full mainspring force will act to move the coupling sleeve 81 and shaft 13 upwardly as seen in FIGS. 4a and 4b, until such upward movement is arrested by engagement of the pendulum 16 with one of the stop shoulder 275–275e and resultant operation of the coding stops 75–75f, as previously described. In order to establish and maintain alignment of the depressions 93 in the coupling sleeve 81 with the balls 91, while allowing the necessary axial movement of the coupling sleeve 81, the ball carrying coupling collar 90 is provided with a pin 94 slidable in an elongated slot 95 in the sleeve 81.

When downward fluid flow is resumed, the knob 14 as previously described will move downwardly through the pulse rings 7 producing therewith restrictions in the flow area productive of pressure pulses or signals in the drilling fluid indicative of the angle of the instrument from vertical. When the knob 14 passes below the lowermost pulse ring 7, the relationship of the coupling collar 90 to the body 30 of the instrument will be such that the balls 91 will engage in the groove 92 and the force of spring 15a, which is undergoing compression will resist further downward movement of the collar 90 as coupling sleeve 81 continues to move downwardly. Thus the balls 91 will be cammed out of the depressions 93 and held in the groove 92 by the coupling sleeve 81, and at such time the only force of mainspring means 15 tending to hold the knob 14 above its full down position will be the force supplied by the light spring 15b above the coupling collar. Thus, the invention provides relative assurance that the knob 14 will be in the full down position and the pendulum 16 seated in its seat 19, during subsequent drilling operations.

Moreover, such a mainspring assembly would be of benefit in assuring that a pendulum releasing latch mechanism such as that shown in my pending application Ser. No. 562,146, filed July 1, 1966 would be relatched responsive to movement of the shaft to a full down position.

While the specific details of an illustrative embodiment of the invention have been herein shown and described, changes and alterations may be made without departing from the spirit of the invention.

I claim:

1. In a signalling apparatus adapted to be installed in a well drilling string for producing pressure signals in a stream of well drilling fluid indicative of the angular disposition of the drilling string, said apparatus comprising: an elongated housing, a shaft having a free end projecting from an end of said housing, spring means in said housing for biasing said shaft longitudinally outward with respect to said housing, gravity responsive means including a pendulum and stops spaced longitudinally in said housing for limiting such movement of said shaft, said free end of said shaft having a surface responsive to the flow of drilling fluid for moving said shaft inward with respect to said housing against said biasing means, and pressure pulse producing means for producing said signals during inward movement of said shaft, the improvement wherein said spring means includes means for applying a small force biasing said shaft outwardly during an initial portion of its outward movement and during the terminal portion of inward movement of said shaft and a larger force biasing said shaft outwardly during the remainder of the outward and inward movement of said shaft.

2. Signalling apparatus as defined in claim 1, wherein said spring means includes a light spring operable during the initial portion of outward movement and during the terminal portion of inward movement of said shaft, and a strong spring operable during the remainder of the outward and inward movement of said shaft.

3. Signalling apparatus as defined in claim 2, wherein force transfer means are provided for transferring the force of said strong spring to said housing during the initial and terminal portions of movement of said shaft.

4. Signalling apparatus as defined in claim 3, wherein said force transfer means includes coupling means automatically releasable from and connectable to said housing following the initial portion of movement and prior to the terminal portion of movement of said shaft.

5. Signalling apparatus as defined in claim 3, wherein said force transfer means includes a coupling collar interposed between said light and strong springs, said coupling collar being disposed about a portion of said shaft, and said housing said portion of said shaft and said coupling collar having coengageable latch means for automatically latching said collar to said housing prior to said terminal portion of inward movement of said shaft and for releasing said collar from said housing following said initial portion of outward movement of said shaft.

6. Signalling apparatus as defined in claim 5, wherein said latch means includes balls carried by said coupling collar, ball receiving means on said portion of said shaft and ball receiving means in said housing, said coupling collar being free for movement with said portion of said shaft when said balls are in the ball receiving means on said portion of said shaft and said coupling collar being latched to said housing when said balls are in the ball receiving means in said housing and out of the ball receiving means on said portion of said shaft.

7. Signalling apparatus as defined in claim 6, wherein said ball receiving means on said portion of said shaft comprises circularly spaced depressions, and said coupling collar and said portion of said shaft having means for maintaining said balls and depressions in alignment when said balls are out of said depressions.

8. Signalling apparatus as defined in claim 6, wherein said ball receiving means on said portion of said shaft comprises circularly spaced depressions, said collar having a pin and said portion of said shaft having an axially extended slot in which said pin is disposed for maintaining said balls and depressions in alignment when said balls are out of said depressions.

9. Signalling apparatus as defined in claim 6, wherein said ball receiving means in said housing comprises an annular groove.

10. Signalling apparatus as defined in claim 6, wherein said ball receiving means in said housing comprises an annular depression having a downwardly facing bevelled wall.

References Cited

UNITED STATES PATENTS 3,176,407   4/1965   Alder et al.
1,905,299   4/1933   McLaughlin et al.

LEONARD FORMAN, Primary Examiner

F. J. D'AMBROSIO, Assistant Examiner

U.S. Cl. X.R.

175—45